US010325456B2

(12) United States Patent
Ward et al.

(10) Patent No.: US 10,325,456 B2
(45) Date of Patent: Jun. 18, 2019

(54) COMMUNICATION DEVICES INCLUDING AN ILLUMINATION SOURCE AND A PHYSICAL INPUT SENSOR

(71) Applicant: FINISAR CORPORATION, Sunnyvale, CA (US)

(72) Inventors: Rafik Ward, Menlo Park, CA (US); Stephen T. Nelson, Santa Clara, CA (US); Frank Flens, Campbell, CA (US); Cindy Hsin-I Hsieh, Los Altos, CA (US); Lucy G. Hosking, Santa Cruz, CA (US); Joshua Moore, Sunnyvale, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/818,731

(22) Filed: Nov. 20, 2017

(65) Prior Publication Data
US 2018/0089966 A1 Mar. 29, 2018

Related U.S. Application Data

(62) Division of application No. 14/957,199, filed on Dec. 2, 2015, now Pat. No. 9,824,552, which is a division of application No. 13/797,673, filed on Mar. 12, 2013, now Pat. No. 9,230,416.

(60) Provisional application No. 61/680,195, filed on Aug. 6, 2012.

(51) Int. Cl.
*G08B 3/00* (2006.01)
*G08B 5/38* (2006.01)
*G08B 5/00* (2006.01)
*G08B 5/36* (2006.01)
*G02B 6/38* (2006.01)
*G02B 6/42* (2006.01)
*H04B 10/40* (2013.01)
*H01R 13/717* (2006.01)
(Continued)

(52) U.S. Cl.
CPC ............ *G08B 5/38* (2013.01); *G02B 6/3895* (2013.01); *G02B 6/4261* (2013.01); *G02B 6/4292* (2013.01); *G08B 5/00* (2013.01); *G08B 5/36* (2013.01); *H01R 13/7172* (2013.01); *H04B 10/40* (2013.01); *H04Q 1/13* (2013.01); *H04Q 1/136* (2013.01); *G02B 6/4246* (2013.01); *G02B 6/4284* (2013.01); *H01R 13/6335* (2013.01)

(58) Field of Classification Search
CPC ............ H01R 13/717; H01R 13/7175; H01R 13/6691; H01R 13/6683; H01R 13/641; H01R 3/00
USPC ........................ 340/691.1, 686.1, 687, 815.4
See application file for complete search history.

(56) References Cited

U.S. PATENT DOCUMENTS 5,062,807 A * 11/1991 Guss, III ............... H01R 13/717
340/815.76
6,577,243 B1 * 6/2003 Dannenmann ....... H01R 13/641
324/66

(Continued)

*Primary Examiner* — Toan N Pham
(74) *Attorney, Agent, or Firm* — Maschoff Brennan

(57) ABSTRACT

Communication devices are disclosed. In an example embodiment, a communication device may include a communication module including an illumination source and a body element. The body element may be configured to allow illumination generated by the illumination source to propagate within and illuminate at least a portion of an outer surface of the body element.

11 Claims, 8 Drawing Sheets

(51) Int. Cl.
*H04Q 1/02* (2006.01)
*H01R 13/633* (2006.01)

(56) References Cited

U.S. PATENT DOCUMENTS

| | | | | |
|---|---|---|---|---|
| 6,921,284 B2 * | 7/2005 | Sirichai | .............. | H01R 13/6641 439/490 |
| 7,327,278 B2 * | 2/2008 | Dannenmann | ....... | G01R 31/041 324/66 |
| 7,914,319 B2 * | 3/2011 | Jones | ................... | H01R 13/641 439/489 |
| 2017/0003459 A1 * | 1/2017 | Takeuchi | ............. | G02B 6/3895 |

* cited by examiner

COMMUNICATION DEVICES INCLUDING AN ILLUMINATION SOURCE AND A PHYSICAL INPUT SENSOR

CROSS-REFERENCE TO RELATED APPLICATIONS

This application is a divisional application of U.S. patent application Ser. No. 14/957,199, filed Dec. 2, 2015, entitled COMMUNICATION DEVICES INCLUDING AN ILLUMINATION SOURCE AND A PHYSICAL INPUT SENSOR, which is a divisional application of U.S. patent application Ser. No. 13/797,673, filed Mar. 12, 2013, entitled COMMUNICATION DEVICES INCLUDING AN ILLUMINATION SOURCE AND A PHYSICAL INPUT SENSOR, which claims priority to U.S. Provisional Application No. 61/680,195, filed Aug. 6, 2012, entitled VISUAL INDICATOR, all of which are incorporated by reference in their entirety.

BACKGROUND

Field

Embodiments relate generally to communication devices. Example embodiments relate to illuminable visual indicators for communication devices that may be used in data center port management, digital diagnostics, and other similar applications. Further embodiments relate to communication devices including sensors configured to detect physical input at the communication device.

Relevant Technology

Data centers play an integral role in providing many computing services. Data centers may include thousands of host devices, such as host computers, switching hubs, network routers, or switch boxes. Communication modules, such as electronic or optoelectronic transceiver or transponder modules, may be connected to these host devices. Some host devices include multiple cages and can, therefore, accommodate multiple communication modules simultaneously. Many communication modules are pluggable, which permits the modules to be inserted into and removed from a cage or a port of the host devices. Cages of the host devices may include latches for engaging the module to prevent accidental release. Some communication modules include a handle, which will allow the modules to be inserted into and/or removed from the host device cage or port by way of the handle. Where the module is engaged by a latch, the handle may allow a user to disengage the latch by pulling the handle.

Each communication module typically communicates with a printed circuit board (PCB) of the host device by transmitting and/or receiving electrical data signals to and/or from the host device PCB. Data signals can also be transmitted by the communication modules outside the host device as optical and/or electrical data signals. Transmitting data signals outside the host device may be done via cables plugged into a port of the communication module.

In a data center, thousands of cables may be employed to interconnect the host devices. Some cable connections may be made using active communication devices such as active cables. Active cables include communication cables with communication modules at one or both ends of the communication cables. One particular active cable may include optoelectronic modules connected to one or both ends of an optical cable. The communication modules at one or both ends of the communication cables may be plugged into ports of the host devices. The communication modules of some active cables include handles, which are often described as "pull tabs." The communication modules of such active cables may be inserted into and/or removed from ports of host devices by way of the handle.

Frequently, data centers do not have accurate maps of the thousands of cable connections between ports of the host devices. In some instances, if a host device or communication module issues an alarm that something has gone wrong, finding an exact port on an exact host device may be a time-consuming process. Furthermore, cables are often kept in large bundles of like-colored cables that may be difficult for a person to follow from one end to another.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Embodiments relate to communication devices. In some instances, the communication devices may include visual indicators and/or sensors that may assist data center port management.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a communication device may include a communication module including an illumination source and a body element. The body element may be configured to allow illumination generated by the illumination source to propagate within and illuminate at least a portion of an outer surface of the first body element.

In another example embodiment, a body element may include a protrusion configured to enable a person to grip and remove the communication module from a retaining connection. The protrusion may be configured to allow illumination generated by an illumination source of the communication module to propagate within and illuminate at least a portion of an outer surface of the protrusion.

In another example embodiment, a communication module includes a sensor configured to detect a physical input applied at the communication module. The sensor is in communication with the communication module such that the communication module performs an act in response to the physical input applied at the communication module.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

Embodiments will be described and explained with additional specificity and detail through the use of the accompanying drawings in which.

DESCRIPTION OF EMBODIMENTS

Figure 1A:
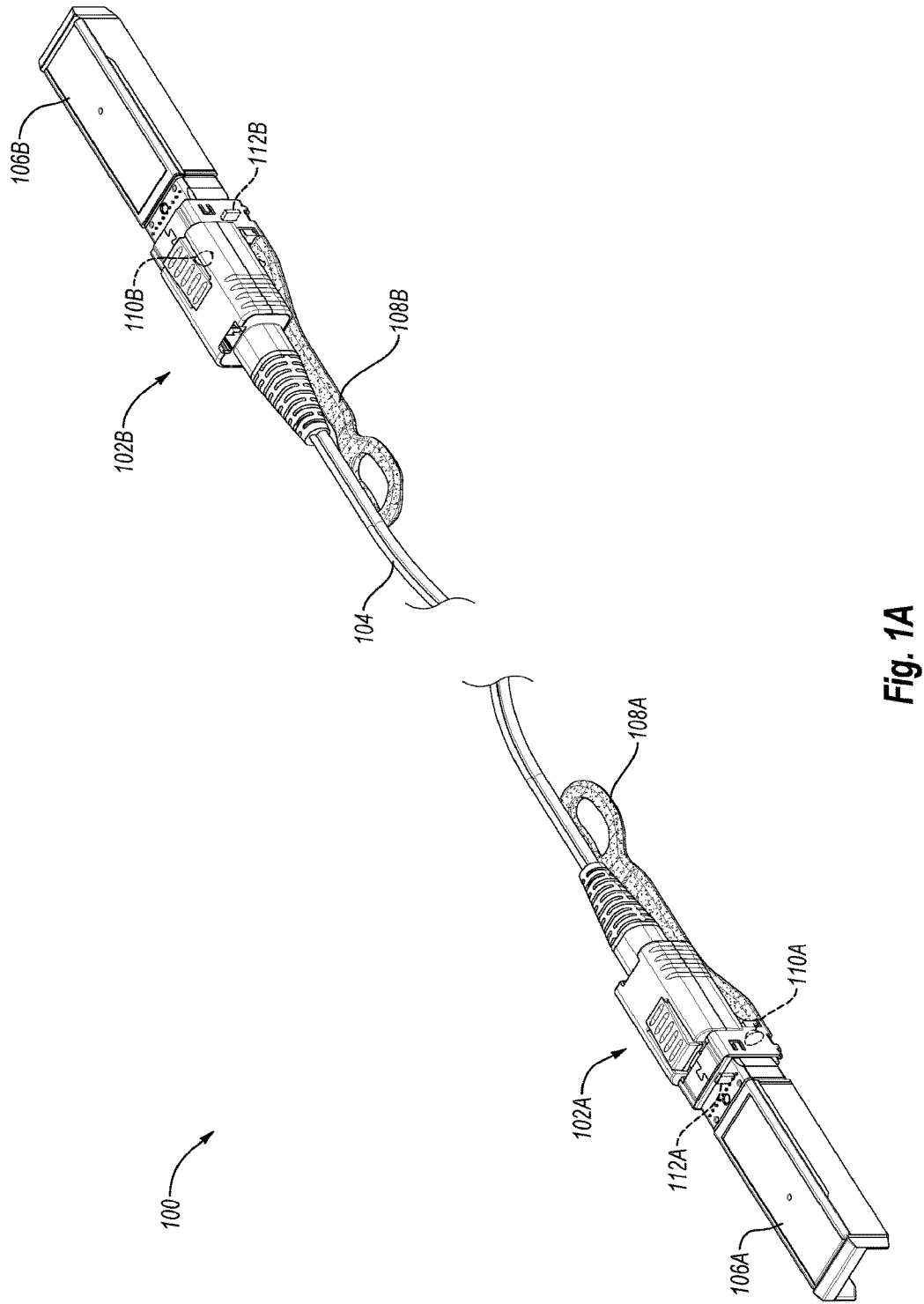
FIG. 1A is a top perspective view of an example active cable.

Example embodiments relate to communication devices including illuminable visual indicators and/or sensors for detecting a physical input from a user at the communication device. The communication device may include a communication module having an illumination source and a body element. The body element may allow illumination generated by the illumination source to propagate within the body element such that an outer surface of the body element is illuminated.

The communication module may alternately or additionally include a sensor configured to detect a physical input from a user at the communication module. In response to the physical input, the communication module may cause the communication module to perform an action. For example, upon detecting the physical input, the communication module may cause an illumination source of a connected communication module to turn on. For example, upon detecting the physical input, the communication module may send a signal via a cable to the connected communication module such that the connected communication module turns on its illumination source.

Advantageously, when a body element of a communication module is illuminated, it may allow the communication module to be accurately, quickly, and conveniently identified. The illumination may be particularly helpful for identifying a particular optoelectronic module among a multitude of similar communication modules located together in close proximity. For example, communication modules having selectively illuminable body elements may be particularly useful for identifying a particular communication module from among other nearby communication modules in a data center. Advantageously, including a sensor in a communication module may allow a user to physically manipulate the communication module such that it performs an action such as causing a connected communication module to illuminate a body element. The inclusion of a sensor within the communication module may be particularly useful in finding both ends of a connection when one end of the connection is known.

The embodiments described herein can be implemented in various communication modules, including electronic modules, optoelectronic modules, optical engines, and the like. As used herein, the term "optoelectronic module" includes modules having both optical and electrical components. Examples of electronic and optoelectronic modules include, but are not limited to, active electrical cables, active optical cables, transponders, transceivers, transmitters, and/or receivers. Electronic and optoelectronic modules can be used, for instance, in telecommunications networks, local area networks, metro area networks, storage area networks, wide area networks, and the like and can be configured to conform with one or more standardized form factors or multi-source agreements (MSAs), including the QSFP, QSFP+, CXP, CFP, CFP2, CFP4, XFP, SFE, SFP, and SFP+ form factors, without restriction. It will be appreciated, however, that the electronic and optoelectronic modules need not comply with standardized form factor requirements and may have any size or configuration necessary according to a particular design.

The communication modules according to some embodiments can be configured for electrical and/or optical signal transmission and reception at a variety of per-second data rates including, but not limited to, 10 gigabits per second (G), 40G, 100G, or higher. As used herein, the terms "10G," "40G," "100G," and similar terms represent rounded approximations of common signaling rates and have the meanings commonly understood by those of skill in the art.

Furthermore, the communication modules according to some embodiments can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the communication modules can be configured to support various transmission standards including, but not limited to, Ethernet, Fibre Channel, INFINIBAND, and synchronous optical networking (SONET) and/or Synchronous Digital Hierarchy (SDH).

Advantageously, embodiments described herein may allow particular communication modules to be identified accurately, quickly, and conveniently. In some instances, a user may make a physical input at a first communication module attached to a cable to cause a second communication module attached to the cable to light up. As a result, a user may accurately, quickly, and conveniently identify both ends of a particular cable.

Reference will now be made to the figures wherein like structures will be provided with like reference designations. It should be understood that the drawings are diagrammatic and schematic representations of exemplary embodiments and, accordingly, are not limiting of the scope of the present invention, nor are the drawings necessarily drawn to scale.

FIG. 1A is a perspective view of an example active optical cable 100. Although illustrated as an active optical cable, embodiments may include active electronic cables and the like. The active optical cable 100 may be used in transmitting and receiving optical signals in connection with a host device (not shown) that is operatively connected in some embodiments to a communication network (not shown). As illustrated in FIG. 1A, the active optical cable 100 includes a first optoelectronic module 102A and a second optoelectronic module 102B. The first optoelectronic module 102A and the second optoelectronic module 102B may be collectively described as "optoelectronic modules 102." Collective reference to the optoelectronic modules 102 should be understood to include both or either of the optoelectronic modules 102A, 102B (i.e., the optoelectronic modules 102 can be considered to include "first optoelectronic module 102A and/or second optoelectronic module 102B"). The optoelectronic modules 102 may be communicatively connected by an optical cable 104. The optoelectronic modules 102 may each include a body 106A and 106B (collectively "bodies 106"). The bodies 106 may be configured to form a pluggable connection with the host device. The bodies 106 may contain connectors (shown in FIG. 1D) that communicate electrical data signals to the host device.

The optoelectronic modules 102 may each include a handle 108A and 108B (collectively "handles 108"). The handles 108 may be formed from protrusions configured to enable a person to grip and remove the optoelectronic modules 102 from retaining connections. The handles 108 may be made from a material that allows illumination to propagate within the handles 108. The handles 108 may be configured to transport and distribute illumination originating from an illumination source 110A and 110B (collectively "illumination sources 110") within the optoelectronic modules 102 to an exposed surface of the handles 108. In some embodiments, the optoelectronic modules 102 may include conduits configured to propagate illumination from the illumination sources 110 to an illumination entry surface of the handles 108. In some embodiments, the handles 108 may be configured to receive illumination at the illumination entry surface and distribute the illumination evenly over the exposed surface of the handles 108.

Figure 1B:
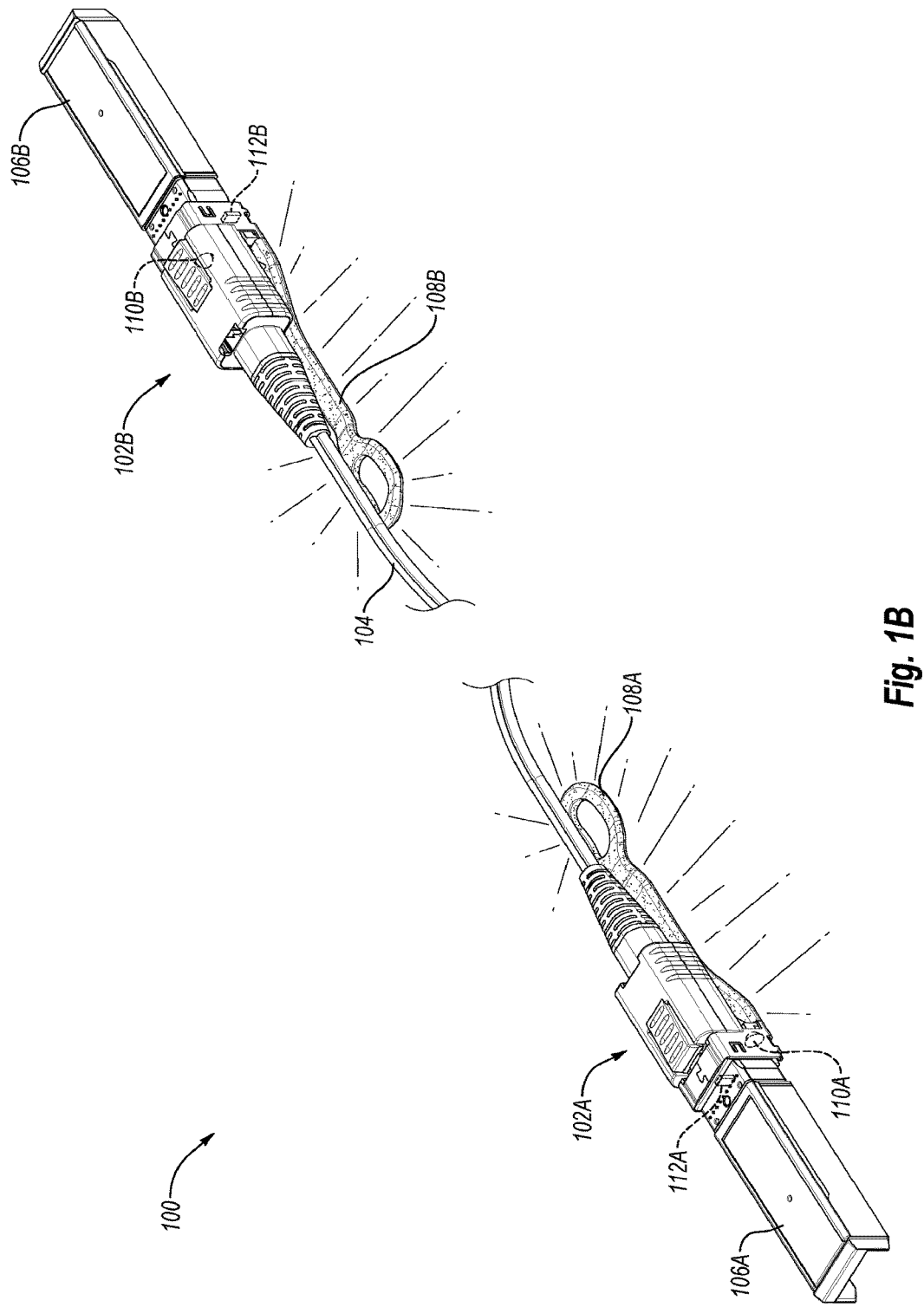
FIG. 1B illustrates the active cable of FIG. 1A including illuminated handles.

FIG. 1B illustrates the active cable 100 of FIG. 1A including illuminated handles 108. Either handle 108A or handle 108B may be illuminated independently, or both handles 108 may be illuminated as shown in FIG. 1B. The first optoelectronic module 102A may turn on an illumination source 110A, which may illuminate the handle 108A. The handle 108A, when illuminated, may allow a person to identify the first optoelectronic module 102A by its illuminated handle 108A. When the handle 108A is illuminated, a person may be able to accurately, quickly, and conveniently identify the first optoelectronic module 102A among a multitude of communication modules (not shown) similar in appearance and located together in close proximity. For example, when the handle 108A is illuminated, a person may be able to identify the first optoelectronic module 102A from among other nearby communication modules in a data center.

The second optoelectronic module 102B may be configured to turn on an illumination source 110B and illuminate the handle 108B in a manner that generally corresponds to that of the first optoelectronic module 102A.

Handles 108 of optoelectronic modules 102 may provide a relatively large surface area in a relatively exposed position. Illuminating the handles 108 may provide increased visibility for optoelectronic modules 102 that have turned on their illumination sources 110, particularly when compared to other indicator lights on a surface of the optoelectronic modules 102 or the host device. Illuminated handles 108 or other body elements extending from the optoelectronic modules 102 may provide increased visibility from a distance. Although illumination of the handles 108 is described, other body elements of the optoelectronic modules 102 may be configured to be illuminated when the illumination sources 110 of the optoelectronic modules 102 are turned on.

The illumination sources 110 may include one or more light-emitting diodes (LEDs) located in the optoelectronic modules 102. Alternately or additionally, another type of illumination source may be used. The illumination sources 110 may produce multiple colors. In some embodiments, different colors may communicate different diagnostic states such as messages, alarms, alerts, warnings, information, and the like. The illumination sources 110 may be made to flash on and off at different rates. In some embodiments, different flashing rates may be used to quantify information about the optoelectronic modules 102, or information about the signal being transmitted or received from or at the communication modules. Alternately or additionally, different flashing rates may communicate different diagnostic states generally corresponding to those described with reference to using different colors. In some embodiments, the color and/or flashing rates of a first illumination source 110A at the first optoelectronic module 102A may indicate a physical address label of the second optoelectronic module 102B.

In some embodiments, the signals provided by the illumination sources 110 may be observed by the human eye and understood by the observer. Alternately or additionally, the signals provided by the illumination sources 110 may be received and interpreted by an electronic device.

Diagnostic states communicated by the illumination provided by the illumination sources 110 may include alarm and warning set points triggered from: a transmission power of the optoelectronic modules 102, a receiver input power of the optoelectronic modules 102, a temperature of the optoelectronic modules 102, or a bias current of the optoelectronic modules 102. Alternately or additionally, diagnostic states communicated by the illumination provided by the illumination sources 110 may include: jitter, input amplitudes, output amplitudes of a signal, loss of signal (LOS), or other fault conditions at the optoelectronic modules 102. In some embodiments, the illumination sources 110 in the optoelectronic modules 102 may be turned on for a time when the optoelectronic modules 102 are first plugged in to a host device in order to indicate that the optoelectronic modules 102 are properly connected.

Illuminating a body element such as the handles 108 of the optoelectronic modules 102 may allow elimination of indicator lights that would otherwise be included on an outer surface of the optoelectronic modules 102. Surface areas of the optoelectronic modules 102 originally reserved for indicator lights may be reallocated for another use. In instances where indicator lights are included on the host device for communicating a status of the optoelectronic modules 102, the areas of the host devices dedicated to the indicator lights may instead be used for other purposes and/or eliminated to increase the density of ports on the host device.

The optoelectronic modules 102 may be configured to turn on the illumination sources 110 in response to receiving a command from the host device. Alternately or additionally, the optoelectronic modules 102 may turn on the illumination sources 110 in response to receiving a command via the optical cable 104.

The command may be transmitted by the first optoelectronic module 102A to the second optoelectronic module 102B via an out-of-band signal over the optical cable 104. The out-of-band communication may be done in a manner that does not interfere with data traffic sent through the optoelectronic modules 102 and through the optical cable 104. In some embodiments, the command may be sent by varying an intensity of a data traffic optical signal. Alternately or additionally, the command may be sent by transmitting direct-current light pulses. Alternately or additionally, other methods of transmitting out-of-band signals may be used. Causing the first optoelectronic module 102A to send a command to the second optoelectronic module 102B such that the second optoelectronic module 102B turns on its illumination source 110B may allow a person to quickly and easily identify all ends of the active optical cable 100.

The optoelectronic modules 102 may each include a sensor 112A and 112B (collectively "sensors 112"). In some embodiments, the sensor 112A, when activated, may preferably cause the first optoelectronic module 102A to send a command to the second optoelectronic module 102B such that the second optoelectronic module 102B turns on its illumination source 110B. Advantageously, the sensor 112A may allow a user at one end of the active optical cable 100 to accurately, quickly, and conveniently identify the second optoelectronic module 102B at the other end of the active optical cable 100. Alternately or additionally, activating the sensor 112A or activating other similar sensors (not shown) may cause the communication module 102A to provide diagnostic states to a user via the illumination source 110A as described herein, and/or may cause the communication module to communicate with the host device or the second communication module 102B. The second optoelectronic module 102B may include a sensor 112B generally corresponding to the sensor 112A.

Figure 1C:
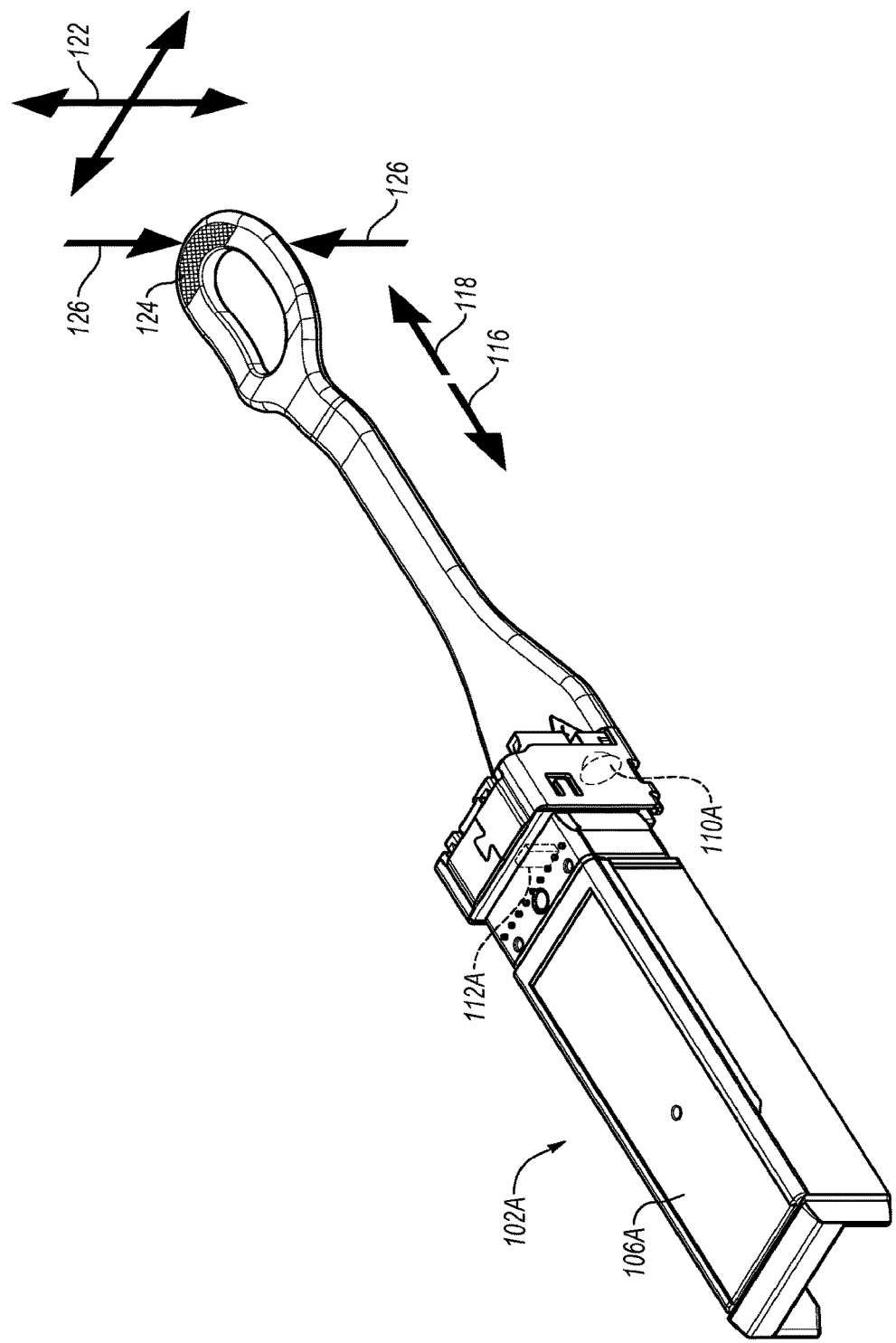
FIG. 1C is a top perspective view of a first optoelectronic module of FIG. 1A.

FIG. 1C is a top perspective view of the first optoelectronic module 102A. The optoelectronic module 102A includes the sensor 112A. The sensor 112A may include, but is not limited to, an actuator, a mechanical switch, a force-sensitive resistor or other force-sensitive device, a capacitive sensor, a thermal sensor, an inductive sensor, a magnetic sensor, or the like. The sensor 112A may be located in any suitable position in or on the optoelectronic module 102A. In some embodiments, the sensor 112A may be positioned to receive physical input applied to the handle 108A and/or to the optoelectronic module 102A independent of the handle 108A. For example, the sensor 112A may be activated by applying a force 116 to the optoelectronic module 102A and/or the handle 108. The force 116 may be applied toward a host device (not shown) connected to the optoelectronic module 102A and is described herein as a pushing force 116.

In some embodiments, the sensor 112A may be activated by moving the optoelectronic module 102A toward the host device as a result of the pushing force 116. In operation, the optoelectronic module 102A may be urged against a retention latch (not shown) of the host device by a spring or some other biasing device. Many types of optoelectronic module 102A include selectively releasable latch mechanisms including biasing devices for urging the optoelectronic module 102A toward the front of the host device and against a retention latch. The selectively releasable latch mechanisms are often operated by rotating a bail at the front of the optoelectronic module 102A. The bail, which may be described as a driver, may generally correspond to the handle 108A for activating the sensor 112A as described herein.

Many types of optoelectronic module 102A may be moved toward the host device by applying a pushing force 116 sufficient to overcome the biasing device urging the optoelectronic module 102A toward the front of the host device and against the retention latch. In some embodiments, the optoelectronic module 102A may include a mechanical switch or the like positioned to be activated by contact with the host device when the optoelectronic module 102A is moved toward the host device.

Alternately or additionally, the sensor 112A may include a mechanical switch or the like positioned to be activated when the mechanical slack of a latching mechanism (not shown) is altered by a pushing force 116 applied to the handle 108A. Alternately or additionally, a force-sensitive sensor such as a force-sensitive resistor, a displacement-sensitive sensor, a pressure-sensitive sensor, or the like may be used to sense when a user applies a pushing force 116 to the optoelectronic module 102A and/or handle 108A.

Figure 1D:
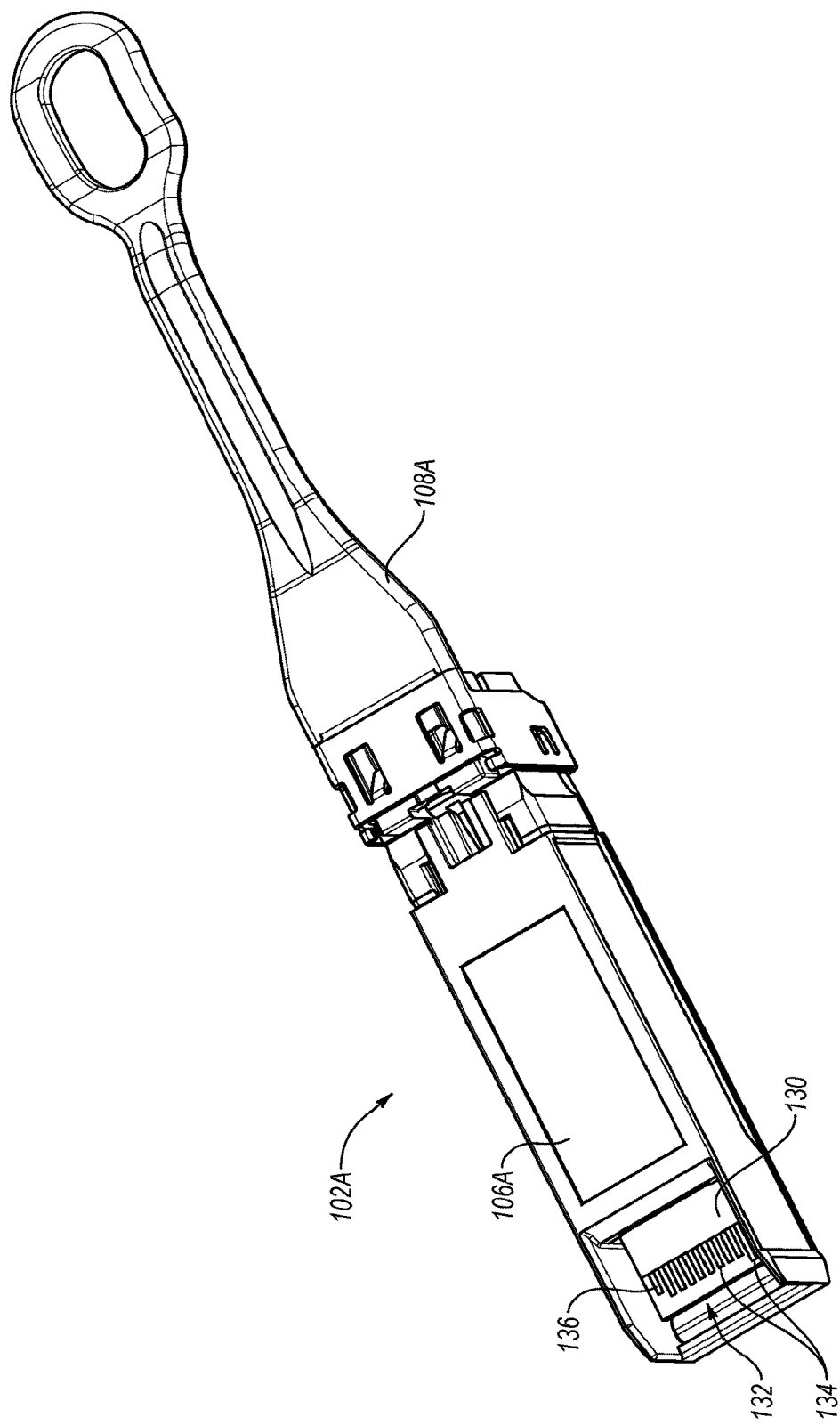
FIG. 1D is a bottom perspective view of the first optoelectronic module of FIG. 1C.

FIG. 1D is a bottom perspective view of the optoelectronic module 102A. The optoelectronic module 102A includes a printed circuit board (PCB) 130 forming an edge connector 132 having multiple conductive contacts 134. In some instances, a pin-out scheme for the edge connector 132 may include a redundant ground contact. In some embodiments, the sensor 112A includes the redundant ground contact 136. The redundant ground contact 136 may be connected to a switch input of the sensor 112A. The redundant ground contact 136 may be positioned to form an open electrical configuration—i.e., avoid contact—with a connector (not shown) of the host device when the optoelectronic module 102A is nominally positioned relative to the host device. The redundant ground contact 136 is further positioned to form a closed electrical configuration—i.e. make contact—with the connector of the host device when the optoelectronic module 102A is pushed toward the host device with a pushing force 116 sufficient to overcome the biasing device urging the optoelectronic module 102A toward the front of the host device and against the retention latch. The contact between the redundant ground contact 136 and the host device contact may act as a switch closure for activating the sensor 112A. In some embodiments, the redundant ground contact 136 may be located on a low-speed side of the edge connector 132.

Referring again to FIG. 1C, in some embodiments, the sensor 112A may be activated by applying a force 118 away from the host device, described herein as a pulling force 118. The degree of the pulling force 118 required to activate the sensor 112A is generally less than that required to unlatch or otherwise remove the optoelectronic module 102A from the host device. The sensor 112A may be activated by a pulling force 118 in a manner generally corresponding to the pushing force 116.

In some embodiments, the sensor 112A may be activated by applying force 122 to the handle substantially parallel to the relative to the host device. The parallel force 122 may include pressing up, down, sideways, and/or applying a moment relative to the host device. The sensor 112A may be activated by a parallel force 122 in a manner generally corresponding to the pushing force 116.

Preferably, the sensor 112A monitors forces on the handle 108A for temporary physical input against a baseline state determined from a long average of the input forces sensed by the sensor 112A. For example, the sensor 112A may include a force-sensitive resistor and may account for static loads applied to the handle 108A, such as loads that may result during use of the optoelectronic module 102A from cables consistently pressing on the handle 108A. However, the sensor 112A may alternately or additionally include one or more mechanical switches and may be activated by one or more particular forces applied to the handle 108A.

In some embodiments, the sensor 112A may include a sensor 124 configured to detect a warm and/or conductive body (not shown) proximate to and/or in contact with the sensor 124. The sensor 124 may include a capacitive, thermal, inductive, and/or optical sensor. The sensor 124 may allow a user to activate the sensor 112A by simply placing a finger or the like proximate to and/or in contact with the sensor 124. The sensor 124 may cover a portion of the handle, as disclosed in FIG. 1C. Alternately, the sensor 124 may cover the handle 108A.

In some embodiments, the sensor 124 may include a membrane switch, force-sensitive resistor, or the like allowing the sensor 112A to be activated by applying a compressive force 126 to a portion of the handle 108A including the sensor 124. For example, the sensor 124 may allow a user to activate the sensor 112A by pinching the tip of the handle 108A between two fingers or the like.

Figure 2A:
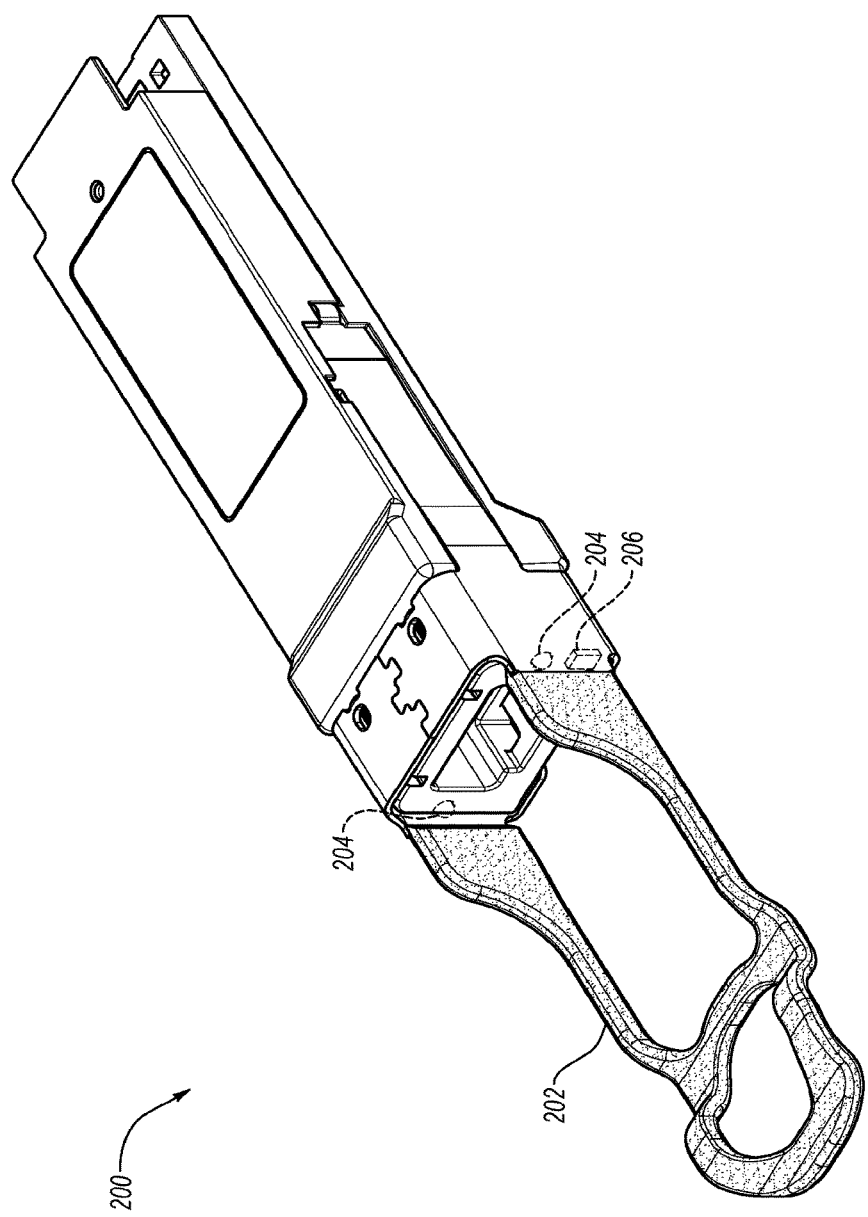
FIG. 2A is a perspective view of an example optoelectronic transceiver including a handle.
Figure 2B:
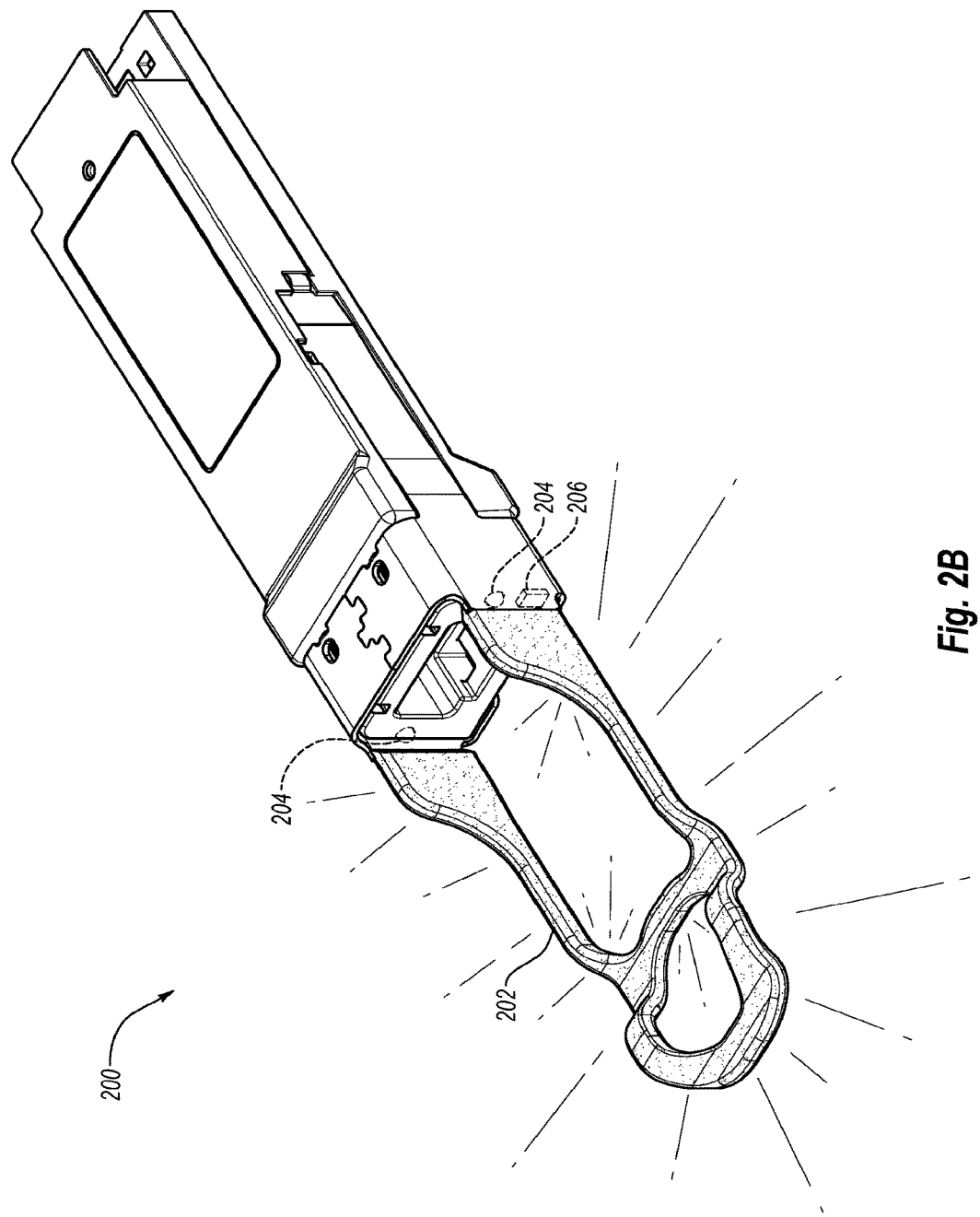
FIG. 2B illustrates the optoelectronic transceiver of FIG. 2A with its handle illuminated.

FIG. 2A is a perspective view of an example optoelectronic transceiver 200 including a handle 202. Although illustrated as an optoelectronic transceiver, embodiments may include electronic transceivers and the like. The handle 202 is configured to transport and distribute illumination originating from an illumination source 204 within the optoelectronic transceiver 200 to the surface of the handle 202. FIG. 2B illustrates the optoelectronic transceiver 200 of FIG. 2A with its handle 202 illuminated. The configuration and operation of the optoelectronic transceiver 200 and illumination of its handle 202 may generally be similar to the configuration and operation of the optoelectronic modules 102 and handles 108 as described with reference to FIGS. 1A-1D. The optoelectronic transceiver 200 may be configured to turn on its illumination source 204 upon receiving a command from a connected host device (not shown) or from another optoelectronic transceiver via a connected cable (not shown). The optoelectronic transceiver 200 may send commands over a connected cable (not shown) that cause a similar optoelectronic transceiver receiving the command to turn on its illumination source. The optoelectronic transceiver 200 may include a sensor 206 generally corresponding to the sensor 112A as described with reference to FIGS. 1A-1D.

Figure 3A:
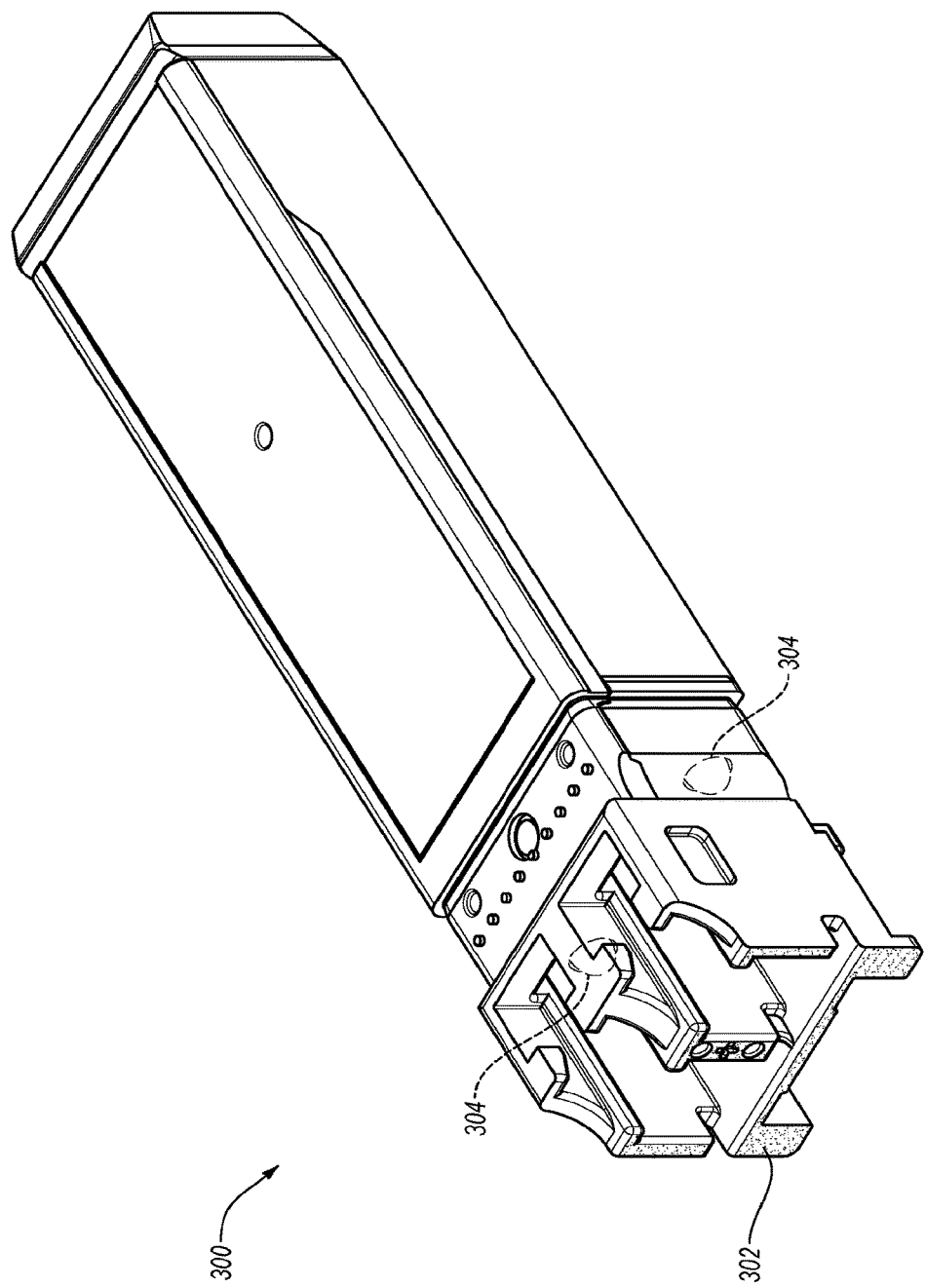
FIG. 3A is a perspective view of an example optoelectronic transceiver without a handle.
Figure 3B:
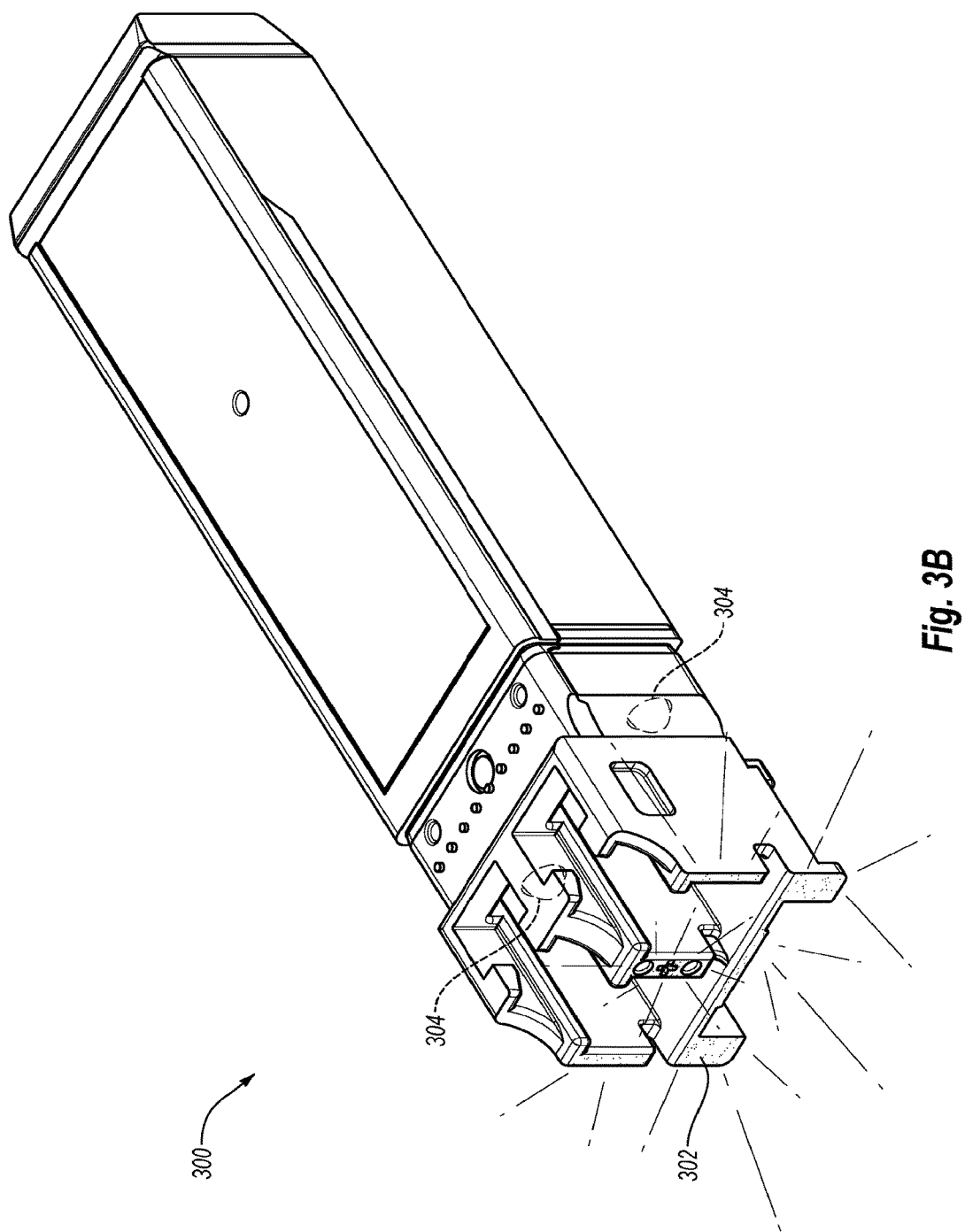
FIG. 3B illustrates the optoelectronic transceiver of FIG. 3A with a surface of the optoelectronic transceiver illuminated.

FIG. 3A illustrates a perspective view of an example optoelectronic transceiver 300 without a handle. Although illustrated as an optoelectronic transceiver, embodiments may include electronic transceivers and the like. The optoelectronic transceiver 300 may be configured to transport and distribute illumination originating from an illumination source 304 within the optoelectronic transceiver 300 to a surface 302. FIG. 3B illustrates the optoelectronic transceiver 300 of FIG. 3A with the surface 302 illuminated. In some embodiments, the surface 302 may be selectively illuminated while an active cable is engaged with the optoelectronic transceiver 300. Although a front face of the optoelectronic transceiver 300 is shown as the illuminated surface 302, the optoelectronic transceiver 300 may be configured to alternately or additionally illuminate other visible surfaces. The configuration and operation of the optoelectronic transceiver 300 and illumination of the surface 302 may generally be similar to the configuration and operation of the optoelectronic modules 102 and handles 108, respectively, as described with reference to FIGS. 1A-1D. In some embodiments, the example optoelectronic transceiver 300 may include a sensor (not shown) generally corresponding to the sensor 112A as described with reference to FIGS. 1A-1D.

Although FIGS. 3A and 3B show an implementation of an illuminated front face of a Lucent connector (LC) style connectorized device, this concept may also be applicable to other connector types, including but not limited to, subscriber connector (SC), registered jack (RJ), RJ-45, multiple-fiber push-on (MPO), mechanical transfer (MT), and the like. In addition, embodiments described herein may be applied to a module without connectors but with a short-length or fiber or copper cable protruding from the front face of the module, often described as "pigtailed" modules.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic communication module comprising:
    a sensor configured to detect a physical input applied at the optoelectronic communication module, the sensor being in communication with the optoelectronic communication module such that the optoelectronic communication module illuminates an illumination source of the optoelectronic communication module in response to the physical input applied at the optoelectronic communication module;
    wherein the optoelectronic communication module is configured to be optically coupled to an optical cable to transmit or receive optical data signals.

2. The optoelectronic communication module of claim 1, wherein the sensor is configured to detect the physical input including a force applied to the optoelectronic communication module toward a host device connected to the optoelectronic communication module.

3. The optoelectronic communication module of claim 2, wherein the sensor includes a redundant ground contact positioned to form:
    an open electrical configuration with a connector of the host device when the optoelectronic communication module is nominally positioned relative to the host device, and
    a closed electrical configuration with the connector of the host device when the force is applied to the optoelectronic communication module toward the host device.

4. The optoelectronic communication module of claim 1, wherein the sensor is configured to detect the physical input including a force applied to the optoelectronic communication module away from a host device connected to the optoelectronic communication module.

5. The optoelectronic communication module of claim 1, wherein the sensor is configured to detect temporary physical input against a baseline state determined from a long average of the physical input sensed by the sensor.

6. The optoelectronic communication module of claim 1, wherein the sensor is configured to detect the physical input including a body proximate to or in contact with the sensor.

7. The optoelectronic communication module of claim 1, wherein the illumination source is capable of producing a plurality of colors or flashing on and off at a plurality of rates to indicate a diagnostic state or a physical address label of the optoelectronic communication module.

8. A body element of an optoelectronic transceiver configured to be optically coupled to an optical cable to transmit or receive optical data signals, the body element comprising:
    a protrusion configured to enable a person to grip and remove the optoelectronic transceiver from a retaining connection,
    wherein the protrusion is configured to allow illumination generated by an illumination source of the optoelectronic transceiver to propagate within and illuminate at least a portion of an outer surface of the protrusion of the optoelectronic transceiver.

9. The body element of claim 8, wherein the protrusion is further configured to allow a sensor of the optoelectronic transceiver to detect a physical input applied at the protrusion, the sensor configured to prompt the optoelectronic transceiver to transmit a command via a cable configured to transmit optical signals to and from the optoelectronic transceiver.

10. The body element of claim 8, further comprising the illumination source, wherein the illumination source is capable of producing a plurality of colors or flashing on and off at a plurality of rates.

11. The body element of claim 10, wherein at least one of the plurality of colors or at least one of the plurality of rates indicates a diagnostic state or a physical address label of the optoelectronic transceiver.

* * * * *